United States Patent
Przybyla et al.

(10) Patent No.: US 10,982,046 B2
(45) Date of Patent: Apr. 20, 2021

(54) REACTION PRODUCTS AND USE OF SAME IN DEFOAMER COMPOSITIONS AND METHODS FOR DEFOAMING

(71) Applicant: BASF SE, Ludwigshafen (DE)

(72) Inventors: David E. Przybyla, Southgate, MI (US); John Mangano, Pineville, NC (US); Brandon C. Achord, Lake Wylie, SC (US)

(73) Assignee: BASF SE

(*) Notice: Subject to any disclaimer, the term of this patent is extended or adjusted under 35 U.S.C. 154(b) by 364 days.

(21) Appl. No.: 15/325,315

(22) PCT Filed: Jul. 9, 2015

(86) PCT No.: PCT/EP2015/065646
§ 371 (c)(1),
(2) Date: Jan. 10, 2017

(87) PCT Pub. No.: WO2016/005477
PCT Pub. Date: Jan. 14, 2016

(65) Prior Publication Data
US 2017/0158813 A1    Jun. 8, 2017

Related U.S. Application Data

(60) Provisional application No. 62/022,979, filed on Jul. 10, 2014.

(51) Int. Cl.
*C08G 65/24* (2006.01)
*C08G 65/337* (2006.01)
(Continued)

(52) U.S. Cl.
CPC ......... *C08G 65/24* (2013.01); *B01D 19/0404* (2013.01); *B01D 19/0427* (2013.01);
(Continued)

(58) Field of Classification Search
CPC .......... B01D 19/0427; B01D 19/0404; C08G 65/24; C08G 65/337; C08G 65/26;
(Continued)

(56) References Cited

U.S. PATENT DOCUMENTS 4,086,279 A * 4/1978 Langdon ............ C08G 65/2609
19/201
5,827,453 A  10/1998 Gross et al.
(Continued)

FOREIGN PATENT DOCUMENTS

WO    98/08890 A1    3/1998
WO    01/60901 A1    8/2001

OTHER PUBLICATIONS

International Search Report and Written Opinion of the International Searching Authority, Application No. PCT/EP2015/065646, dated Dec. 14, 2015, 13 pages.

*Primary Examiner* — Michael A Salvitti
(74) *Attorney, Agent, or Firm* — Faegre Drinker Biddle & Reath LLP

(57) ABSTRACT

Reaction products of an optionally alkoxylated alcohol, a polyalkylene alcohol and a linker can be used in various applications such as defoamers. Methods of making the reaction products and defoamer compositions including the reaction products, and methods of using the reaction products to reduce or prevent foam in a composition are also disclosed. The reaction products can be used with an organic solvent or without an organic solvent to provide low VOC compositions.

20 Claims, 1 Drawing Sheet

(51) Int. Cl.
*C08L 71/02* (2006.01)
*C08G 65/26* (2006.01)
*C09D 5/02* (2006.01)
*B01D 19/04* (2006.01)

(52) U.S. Cl.
CPC ......... *C08G 65/26* (2013.01); *C08G 65/2609* (2013.01); *C08G 65/337* (2013.01); *C08L 71/02* (2013.01); *C09D 5/02* (2013.01); *C09D 5/024* (2013.01); *C08G 2650/06* (2013.01)

(58) Field of Classification Search
CPC ....... C08G 2650/06; C08L 71/02; C09D 5/02; C09D 5/024
USPC ......................................................... 516/134
See application file for complete search history.

(56) References Cited

U.S. PATENT DOCUMENTS

| | | | |
|---|---|---|---|
| 5,877,245 A * | 3/1999 | Wiggins | B01D 19/04 |
| | | | 524/366 |
| 5,895,605 A | 4/1999 | Gross et al. | |
| 6,350,787 B1 | 2/2002 | Wiggins et al. | |
| 6,387,962 B1 | 5/2002 | Wiggins et al. | |
| 6,465,605 B2 * | 10/2002 | Breindel | B01D 19/0427 |
| | | | 528/403 |
| 6,583,185 B2 | 6/2003 | Wiggins et al. | |
| 6,649,733 B1 | 11/2003 | Wiggins et al. | |
| 7,247,606 B2 | 7/2007 | Gross et al. | |
| 2017/0158813 A1 * | 6/2017 | Przybyla | C09D 5/024 |

* cited by examiner

REACTION PRODUCTS AND USE OF SAME IN DEFOAMER COMPOSITIONS AND METHODS FOR DEFOAMING

CROSS-REFERENCE TO RELATED APPLICATIONS

This application is a national stage application filed under 35 U.S.C. § 371 of PCT/EP2015/065646 filed Jul. 9, 2015, which claims the benefit of and priority to U.S. Patent Application No. 62/022,979 filed on Jul. 10, 2014, the disclosures of which are expressly incorporated herein by reference in their entireties.

FIELD OF THE DISCLOSURE

This disclosure relates to defoamer compositions, and more particularly to defoamer compositions that include a crosslinked polymer and to methods of making and using the defoamer compositions.

BACKGROUND OF THE DISCLOSURE

Aqueous compositions such as polymer latexes and latex paints exhibit a tendency toward foaming because they contain surface active agents such as soaps and synthetic detergents. Organic silicon compounds in the form of oils, especially of dimethylpolysiloxanes of low to medium viscosity, have been used as an additive for defoaming aqueous solutions or dispersions. While these defoamer additives are suitable to suppress or reduce the propensity to foaming in polymer dispersions or aqueous coating compositions, it has been observed that paint systems to which polysiloxanes, polyoxyalkylene-polysiloxane copolymers have been added to suppress or reduce formation of foam have shown wetting defects, and also have reduced gloss when applied to surfaces. Wetting of the substrate is not uniform across the area covered which leads to the formation of coating films of varied thickness and defective zones in the coating film. There are also problems of interlayer adhesion associated with the use of defoamers based on organic silicon compounds, for example, craters appear in the coating films particularly if the coating compositions are applied by dipping the substrate into a tank filled with a coating composition.

In view of the foregoing defects of known defoaming agents for water-based paint, there remains a need for defoaming agents which exhibit sufficient defoaming effect upon addition to water-based paint, without impairing high quality coated appearance. The compositions and methods disclosed herein, addresses this need.

SUMMARY OF THE DISCLOSURE

This disclosure relates to the product(s) of reacting an alcohol, a polyalkylene glycol, and a linker. In some embodiments, the reaction can occur in the presence of a base.

The alcohol can be defined as a compound of Formula I:

$R^1$—OH wherein $R^1$ is an aliphatic group containing from 4 to 36 carbon atoms. In some embodiments, the alcohol can be ethoxylated, which can be defined as a compound of Formula Ib:

$R^1$—$(OR^{101})_n$—OH, wherein $R^1$ is as described herein, $R^{101}$ can be ethylene, propylene, butylene, or a combination thereof, and n can be a number from 0 to 50.

The polyalkylene glycol can be defined as a compound of Formula II:

H—$(OR^2)_m$—OH wherein $R^2$ is ethylene, propylene, butylene, or a combination thereof, and m is a number from 1 to 50. In some embodiments, the polyalkylene glycol can be defined as a compound of Formula IIb:

H—$([OR^{202}]_x[OR^{203}]_y)_m$—OH wherein $R^{202}$ is an ethylene group, $R^{203}$ is a propylene group, x is a number from 1-25, y is a number from 1-25.

The linker can be defined as a compound of Formula III:

$R^3(X)_3$ wherein $R^3$ is an alkanetriyl group containing from 3 to 10 carbon atoms, and wherein each X is independently a halogen, or two carbon atoms from the $R^3$ group and an oxygen atom form an epoxy group.

The mole percent of polyalkylene glycol relative to the aliphatic alcohol in the reaction can be from 0.5 mol % to 10 mol %. The mole ratio of the linker to the aliphatic alcohol can be 0.4:1 to 1.5:1. When the base is used, the mole ratio of the base to the aliphatic alcohol can be 1.05:1 to 1.15:1. In some embodiments, the reaction product can be a defoamer and can be included in compositions and methods for reducing or preventing foam in aqueous systems. In some embodiments, the defoamer composition is free of organic solvents. In some embodiments, the defoamer compositions are free, substantially free, or contain very low amounts of volatile organic compounds (VOC's).

In some embodiments, a method of making a defoamer composition is disclosed, comprising reacting the compound of Formula I, the compound of Formula II, and the linking compound of Formula III. The reaction can further include a base such as sodium hydroxide. The compounds of Formula I, Formula II, and Formula III, and of the base can be as described above. In some embodiments, a method for reducing or preventing foam in a composition is disclosed comprising adding to the composition, the reaction product discussed herein. In some embodiments, the composition can further include a carrier capable of dissolving or dispersing the product such as a mineral oil, naphthenic oil, liquid hydrocarbon, silicon oil, polysiloxane, modified polymethylsiloxane, organosilicone, or a combination thereof. In some embodiments, the composition can further include a hydrophobic solid such as a wax, silica, and hydrophobed silica.

In some embodiments, a method for making a defoamer composition comprising reacting the compound of Formula II, the compound of Formula III, and the compound of Formula Ib, $R^1$—$(OR^{101})_n$—OH wherein $R^1$ is an aliphatic group containing from 4 to 36 carbon atoms; $R^{101}$ is ethylene, propylene, butylene, or a combination thereof, and n is a number from 0 to 50, and wherein the reaction does not include an organic solvent. In some embodiments, the in situ reaction product is free, substantially free, or contains very low amounts of VOC's.

The details of one or more embodiments are set forth in the description below. Other features, objects, and advantages will be apparent from the description, the figures, and the claims.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DESCRIPTION OF THE DISCLOSURE

Figure 1:
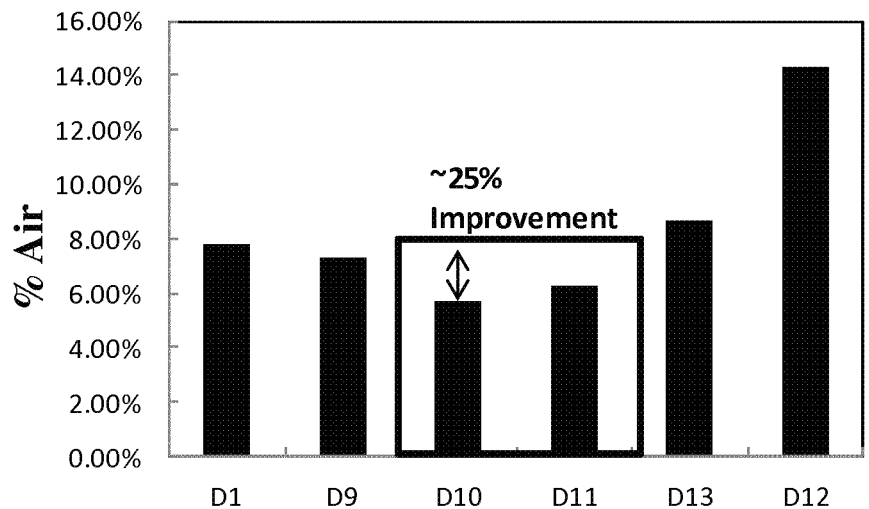
FIG. 1 is a bar graph showing a comparison of percent air entrapment in a <2 g/l VOC architectural paint formulation as a function of the defoaming agent added.

As used in the specification and the appended claims, the singular forms "a," "an" and "the" include plural referents unless the context clearly dictates otherwise. Thus, for example, reference to "an aliphatic group" includes mixtures of aliphatic groups, and reference to "the product from a reaction" includes mixtures of two or more of such products, and the like.

In this specification and in the claims which follow, reference will be made to a number of terms which shall be defined to have the following meanings:

The term "comprising" and variations thereof as used herein are used synonymously with the term "including" and variations thereof and are open, non-limiting terms.

"Optional" or "optionally" means that the subsequently described event or circumstance may or may not occur, and that the description includes instances where said event or circumstance occurs and instances where it does not. For example, the phrase "optionally substituted alkyl" means that the alkyl group may or may not be substituted and that the description includes both unsubstituted lower alkyl and lower alkyl where there is substitution.

"Alkyl", as used herein, refers to the radical of saturated or unsaturated aliphatic groups, including straight-chain alkyl, alkenyl, or alkynyl groups, branched-chain alkyl, alkenyl, or alkynyl groups, cycloalkyl, cycloalkenyl, or cycloalkynyl (alicyclic) groups, alkyl substituted cycloalkyl, cycloalkenyl, or cycloalkynyl groups, and cycloalkyl substituted alkyl, alkenyl, or alkynyl groups. Unless otherwise indicated, a straight chain or branched chain alkyl has 40 or fewer carbon atoms in its backbone (e.g., $C_4$-$C_{36}$ for straight chain, $C_4$-$C_{36}$ for branched chain), 36 or fewer carbon atoms, 30 or fewer carbon atoms, 28 or fewer carbon atoms, 26 or fewer carbon atoms, 24 or fewer carbon atoms, 22 or fewer carbon atoms, 20 or fewer carbon atoms, 16 or fewer carbon atoms, 12 or fewer carbon atoms, 10 or fewer carbon atoms, 8 or fewer carbon atoms, 6 or fewer carbon atoms, or 4 or fewer carbon atoms. In some embodiments, the chain has 1-6 carbons. Likewise, cycloalkyls have from 3-10 carbon atoms in their ring structure, and more preferably have 5, 6 or 7 carbons in the ring structure. The ranges provided above are inclusive of all values between the minimum value and the maximum value.

The term "alkyl" includes both "unsubstituted alkyl" and "substituted alkyl", the latter of which refers to alkyl moieties having one or more substituents replacing a hydrogen on one or more carbons of the hydrocarbon backbone. Such substituents include, but are not limited to, halogen, hydroxyl, alkoxyl, amino, amido, amidine, imine, cyano, nitro, azido, sulfhydryl, alkylthio, sulfate, sulfonate, sulfamoyl, sulfonamido, and sulfonyl. The alkyl groups may also contain one or more heteroatoms within the carbon backbone. Examples include oxygen, nitrogen, sulfur, and combinations thereof. In certain embodiments, the alkyl group contains between one and four heteroatoms.

"Aliphatic" as used herein, refers to a monoradical of a non-aromatic, saturated or unsaturated, unbranched ("straight-chain") or branched, substituted or unsubstituted, acyclic or cyclic chain having 1-40 carbon atoms (i.e., $C_{1-40}$). Thus, as used herein, the term "aliphatic" encompasses the groups straight-chain alkyl, alkenyl, or alkynyl groups, branched-chain alkyl, alkenyl, or alkynyl groups, cycloalkyl, cycloalkenyl, or cycloalkynyl (alicyclic) groups, alkyl substituted cycloalkyl, cycloalkenyl, or cycloalkynyl groups, and cycloalkyl substituted alkyl, alkenyl, or alkynyl groups as defined herein. In certain embodiments, aliphatic refers to a $C_4$-$C_{36}$ aliphatic group. In certain embodiments, aliphatic refers to a $C_2$-$C_{20}$ aliphatic group. In certain embodiments, aliphatic refers to a $C_4$-$C_{10}$ aliphatic group. In certain embodiments, aliphatic refers to a $C_4$-$C_8$ aliphatic group. Unless otherwise specified, each instance of aliphatic is independently unsubstituted ("unsubstituted aliphatic") or substituted ("substituted aliphatic") with 1, 2, 3, 4, 5, 6, 7, 8, 9, 10, or more substituents as described herein. Aliphatic group substituents include, but are not limited to, any of the monovalent or divalent substituents described herein, that result in the formation of a stable moiety.

"Halogen", as used herein, refers to fluorine, chlorine, bromine, or iodine.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aryloxy, substituted aryloxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, peptide, and polypeptide groups.

The term "linker", as used herein, refers to one or more polyfunctional, e.g., bi-functional or tri-functional molecules, which can be used to covalently couple two moieties. For example, a linking group may be used to covalently couple compounds of Formula I and Formula III.

The term "defoamer", as used herein, includes the reduction and/or prevention of foam or foaming in aqueous systems. An aqueous system is any aqueous medium such as an aqueous solution, dispersion or emulsion.

Defoamer compositions that may be used for reduction and/or prevention of foam or foaming in aqueous systems are disclosed herein. The defoamer compositions can contain the in situ product(s) of reacting an alcohol, a polyalkylene glycol, and a linker.

The alcohol can be defined as a compound of Formula I:

$$R^1\text{—OH}$$

wherein $R^1$ is an aliphatic group containing from 4 to 36 carbon atoms. The aliphatic group can be linear, branched, or cyclic. For example, the aliphatic group can be a straight-chain alkyl, alkenyl, or alkynyl groups; branched-chain alkyl, alkenyl, or alkynyl groups; cycloalkyl, cycloalkenyl, or cycloalkynyl groups; alkyl substituted cycloalkyl, cycloalkenyl, or cycloalkynyl groups; cycloalkyl substituted alkyl, alkenyl, or alkynyl groups; a saturated heterocyclic group; an unsaturated heterocyclic group having one or more multiple bonds; a substituted saturated heterocyclic group; or a substituted unsaturated heterocyclic group having one or more multiple bonds. In some embodiments, $R^1$ can be an alkyl group containing from 4 to 22 carbon atoms (e.g., $R^1$ can contain 4 carbon atoms, 5 carbon atoms, 6 carbon atoms, 7 carbon atoms, 8 carbon atoms, 9 carbon atoms, 10 carbon atoms, 11 carbon atoms, 12 carbon atoms, 13 carbon atoms, 14 carbon atoms, 15 carbon atoms, 16 carbon atoms, 17 carbon atoms, 18 carbon atoms, 19 carbon atoms, 20 carbon atoms, 21 carbon atoms, 22 carbon atoms, or combinations thereof).

Representative examples of suitable alcohols include, but are not limited to butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, fatty alcohol, and where the hydroxy group can be located at any carbon atom. The alcohols can be straight-chain (e.g., n-decanol), branched-chain (e.g., t-butanol), or cyclic (e.g., cyclohexanol); cyclic alcohols can be substituted with n-alkyl and/or branched alkyl groups, and cyclic alkanes can be substituted with one straight-chain alcohol or one branched alcohol, plus additional n-alkyl and/or branched alkyl groups. More specifically, suitable alcohols include, but are not limited to, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, LOROL® C8-C9, HD-OCENOL® 90/95V, 2-ethylhexanol, or combinations thereof.

The alcohol used in the reaction can be a mixture of two or more compounds of Formula I. For example, the alcohol can be a mixture of compounds of Formula I with aliphatic groups from 4 to 22 carbon atoms, from 4 to 12 carbon atoms, from 5 to 10 carbon atoms, from 6 to 10 carbon atoms, from 6 to 12 carbon atoms, from 6 to 14 carbon atoms, from 6 to 16 carbon atoms, from 6 to 18 carbon atoms, from 8 to 18 carbon atoms, from 6 to 20 carbon atoms, from 8 to 9 carbon atoms, from 8 to 10 carbon atoms, from 8 to 12 carbon atoms, from 8 to 14 carbon atoms, from 8 to 16 carbon atoms, from 10 to 12 carbon atoms, from 10 to 13 carbon atoms, from 10 to 14 carbon atoms, or from 10 to 16 carbon atoms. Representative examples of suitable mixes of alcohols for use in the defoamer compositions include, but are not limited to, decanol and dodecanol, decanol and 2-ethylhexanol, dodecanol and 2-ethylhexanol, and decanol and Lutensol® XL50.

The weight ratio of the two or more compounds of Formula I can be any suitable weight ratio. For example, the weight ratio of the two compounds of Formula I can be from 1:100 to 100:1 (e.g., 1:50, 1:20, 1:18, 1:16, 1:15, 1:14, 1:12, 1:10, 1:9, 1:8, 1:7, 1:6, 1:5, 1:4, 1:3, 1:2, 1:1, 1:0.5; 2:1, 3:1, 4:1, 5:1, 6:1, 7:1, 8:1, 9:1, 10:1, 12:1, 14:1, 16:1, 18:1, 20:1, 25:1, 50:1, or 100:1). For example, the alcohol can be a mixture of decanol and dodecanol with weight ratio ranging from 1:10 to 10:1, (e.g., the weight ratio can be 9:1, 3:1, 1:3, 1:9, or 1:1). In another embodiment, the alcohol can be a mixture of decanol and 2-ethylhexanol with weight ratio ranging from 1:10 to 10:1, (e.g., the weight ratio can be 9:1, 3:1, 1:3, 1:9, or 1:1). In another embodiment, the alcohol can be a mixture of dodecanol and 2-ethylhexanol with weight ratio ranging from 1:10 to 10:1, (e.g., the weight ratio can be 9:1, 3:1, 1:3, 1:9, or 1:1).

In some embodiments, the alcohol can include an alkoxylated alcohol, defined as a compound of Formula Ib:

$$R^1\text{—}(OR^{101})_n\text{—OH},$$

wherein $R^1$ can be as described herein, $R^{101}$ can be ethylene, propylene, butylene, or a combination thereof, and n can be a number from 0 to 50. For example, the $OR^{101}$ group can be ethyleneoxy, 1-propyleneoxy, 2-propyleneoxy, 1-butyleneoxy, 2-butyleneoxy, or combinations thereof. The number of $OR^{101}$ groups, that is, the value for n, can be 50 or less (e.g., 45 or less, 40 or less, 35 or less, 30 or less, 25 or less, 20 or less, 15 or less, 10 or less, 9 or less, 8 or less, 7 or less, 6 or less, 5 or less, 4 or less, 3 or less, or 2 or less). In some embodiments, n can be 1 or greater, 2 or greater, 3 or greater, 4 or greater, 5 or greater, 6 or greater, 7 or greater, 8 or greater, 9 or greater, 10 or greater, 12 or greater, 15 or greater, 20 or greater, 25 or greater, 30 or greater, 35 or greater, 40 or greater, or 45 or greater. For example, the value for n can be 48, 44, 36, 32, 26, 22, 18, 14, 12, 10, 9, 8, 7, 6, 5, 4, 3, 2, or 1. The $R^{101}$ groups in Formula Ib can be any combination of two or more of ethyleneoxy, 1-propyleneoxy, 2-propyleneoxy, 1-butyleneoxy, or 2-butyleneoxy units in any mole ratio. For example, the $OR^{101}$ group in Formula Ib can contain ethyleneoxy, 1-propyleneoxy, 2-propyleneoxy, 1-butyleneoxy, and 2-butyleneoxy units, or ethyleneoxy, 1-propyleneoxy, and 1-butyleneoxy units, or ethyleneoxy and 1-propyleneoxy units. The —OH group can be covalently bonded to any carbon atom of the $OR^{101}$ group.

In some embodiments, the alcohol can be further defined as a compound of Formula Ic:

$$R^1\text{—}[OR^{102}]_x[OR^{103}]_y\text{—OH}$$

wherein $R^{102}$ and $R^{103}$ can independently be selected from ethylene, propylene, or butylene groups, x is a number from 0-25, y is a number from 0-25, and wherein the sum of x+y is at least 1. The values of x and y can independently be less than 25, less than 20, less than 18, less than 16, less than 14, less than 12, less than 10, less than 9, less than 8, less than 7, less than 6, less than 5, less than 4, less than 3, less than 2, or less than 1. The values of x and y can independently be 1 or greater, 2 or greater, 3 or greater, 4 or greater, 5 or greater, 6 or greater, 7 or greater, 8 or greater, 9 or greater, 10 or greater, 12 or greater, 15 or greater, or 20 or greater. For example, the value of x or y can independently be 25, 22, 20, 15, 12, 10, 9, 8, 7, 6, 5, 4, 3, 2, 1, or 0. The $[OR^{102}]$ and $[OR^{103}]$ groups can be provided either as blocks or can be random. In some embodiments, x is a number from 1-25. In some embodiments, y is 0. In some embodiments, x is a number from 1-25, y is a number from 1-25, wherein the sum of x+y is at least 2.

In some embodiments, $R^{102}$ can be an ethylene group and $R^{103}$ can be a propylene group. The mole ratio of the $R^{102}$ and $R^{103}$ groups (e.g., ethyleneoxy and 1-propyleneoxy) in Formula Ic can be 1:20 (e.g., 1:18, 1:16, 1:15, 1:14, 1:12, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 12:1, 14:1, 16:1, 18:1, 20:1, 25:1, or 50:1). In some embodiments, the alkoxylated alcohol can contain ethyleneoxy and 1-propyleneoxy units with mole ratio ranging from 1:10 to 10:1 (e.g., the mole ratio can be 9:1, 3:1, 1:3, 1:9, or 1:1).

In some embodiments, the compound of Formula Ib or Ic has a number average molecular weight of from 100 to 5000, or from 100 to 2000. In some embodiments, the compound of Formula Ib or Ic has a weight average molecular weight of from 100 to 5000, or from 100 to 2000.

Representative examples of suitable compounds of Formula Ib and Ic include, but are not limited to, alkoxypoly (alkylene glycol), such as methoxy poly(ethylene glycol) 350, 500, 750, 1000 or ethoxypoly(ethylene glycol); ethoxylated alcohols available under the Lutensol trade name, such as Lutensol® XP50, Lutensol® XP90, Lutensol® XL50, or Lutensol® XL90; and combinations thereof. Examples of other compounds of Formula Ib and Ic include, ethoxylated alcohols available under the Tomadol trade name, such as Tomadol 45-7, Tomadol 25-7, Tomadol or Tomadol 91-6. Other examples of compounds of Formula Ib and Ic include, ethoxylated alcohols available under the Neodol trade name, such as Neodol 1-9, Neodol 23-6.5, Neodol 23-9, Neodol 25-7 or Neodol 25-3, Neodol 45-13, or Neodol 91-2.5.

The polyalkylene glycol, that reacts to form the defoamer composition, can be defined as Formula II:

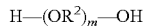

H—(OR²)ₘ—OH wherein $R^2$ is ethylene, propylene, butylene, or a combination thereof. For example, the $OR^2$ group can be ethyleneoxy, 1-propyleneoxy, 2-propyleneoxy, 1-butyleneoxy, 2-butyleneoxy, or combinations thereof. The number of $OR^2$ groups, that is, the value for m, can be from 1 to 100 (e.g., 100 or less, 50 or less, 45 or less, 40 or less, 35 or less, 30 or less, 25 or less, 20 or less, 15 or less, 10 or less, 9 or less, 8 or less, 7 or less, 6 or less, 5 or less, 4 or less, 3 or less, or 2 or less). In some embodiments, the value for m can be 1 or greater, 2 or greater, 3 or greater, 4 or greater, 5 or greater, 6 or greater, 7 or greater, 8 or greater, 9 or greater, 10 or greater, 12 or greater, 15 or greater, 20 or greater, 25 or greater, 30 or greater, 35 or greater, 40 or greater, or 45 or greater. For example, the value for m, can be 48, 44, 36, 32, 26, 22, 18, 14, 12, 10, 9, 8, 7, 6, 5, 4, 3, 2, or 1. The —OH group can be covalently bonded to any carbon atom of the $R^2$ group. In some embodiments, the $OR^2$ group is ethyleneoxy or propyleneoxy.

The $OR^2$ groups in Formula II can be any combination of two or more of ethyleneoxy, 1-propyleneoxy, 2-propyleneoxy, 1-butyleneoxy, or 2-butyleneoxy units in any mole ratio. For example, the $OR^2$ groups in Formula II can contain ethyleneoxy, 1-propyleneoxy, 2-propyleneoxy, 1-butyleneoxy, and 2-butyleneoxy units, or ethyleneoxy, 1-propyleneoxy, and 1-butyleneoxy units, or ethyleneoxy and 1-propyleneoxy units. The mole ratio of the $OR^2$ groups (e.g., ethyleneoxy and 1-propyleneoxy) in Formula II can be 1:50, 1:25, 1:20, 1:18, 1:16, 1:15, 1:14, 1:12, 1:10, 1:9, 1:8, 1:7, 1:6, 1:5, 1:4, 1:3, 1:2, or 1:1. For example, the polyalkylene glycol can contain ethyleneoxy and 1-propyleneoxy units with mole ratio ranging from 1:10 to 10:1 (e.g., the mole ratio can be 9:1, 3:1, 1:3, 1:9, or 1:1).

In some embodiments, the polyalkylene glycol can be further defined as a compound of Formula IIb:

H—[OR²⁰²]ₓ[OR²⁰³]ᵧ—OH wherein $R^{202}$ and $R^{203}$ can independently be selected from ethylene, propylene, or butylene groups, x is a number from 1-25, y is a number from 1-25. The values of x and y can independently be less than 25, less than 20, less than 18, less than 16, less than 14, less than 12, less than 10, less than 9, less than 8, less than 7, less than 6, less than 5, less than 4, less than 3, or less than 2. In some embodiments, the values of x and y can independently be greater than 1, greater than 2, greater than 3, greater than 4, greater than 5, greater than 6, greater than 7, greater than 8, greater than 9, greater than 10, greater than 12, greater than 15, or greater than 20. For example, the values of x and y can independently be 25, 22, 20, 15, 12, 10, 9, 8, 7, 6, 5, 4, 3, 2, or 1.

Representative examples of suitable compounds of Formula II or IIb include, but are not limited to, diethylene glycol, triethylene glycol, tetraethylene glycol, PEG 200 up to PEG 2000 (e.g., PEG 200, PEG 300, PEG 400, PEG 600, PEG 800, PEG 1000, PEG 1200, PEG 1400, PEG 1500, PEG 1600, or PEG 2000). In some embodiments, the compound of Formula II or IIb has a number average molecular weight of from 100 to 5000, or from 100 to 2000. In some embodiments, the compound of Formula II or IIb has a weight average molecular weight of from 100 to 5000, or from 100 to 2000.

The polyalkylene glycol used in the reaction to form the defoamer composition can be a mixture of two or more compounds. For example, the polyalkylene glycol can be a mixture of any PEG compounds ranging from PEG 200 up to PEG 2000. Representative examples of suitable mixtures of compounds include, but are not limited to, PEG 200 and PEG 400, PEG 200 and PEG 300, and PEG 300 and PEG 400.

The linker, that reacts to form the defoamer composition, can be defined as a compound of formula III:

R³(X)₃ wherein $R^3$ can be an alkanetriyl group containing from 3 to 10 carbon atoms (e.g., 3 carbon atoms, 4 carbon atoms, 5 carbon atoms, 6 carbon atoms, 7 carbon atoms, 8 carbon atoms, 9 carbon atoms, 10 carbon atoms, or combinations thereof). X can be a halogen, for example, fluorine, chlorine, bromine, iodine, or combinations thereof.

Representative examples of suitable compounds of Formula III include, but are not limited to, trihaloalkanes, such as 1,2,3-trichloropropane, 1,2,4-trichlorobutane, 1,3,6-trichlorohexane, and the like. In some embodiments, the linker can contain two or more compounds of Formula III. For example, the linker can comprise two or more containing $R^3$ groups from 3 to 10 carbon atoms, from 3 to 9 carbon atoms, from 3 to 8 carbon atoms, from 3 to 7 carbon atoms, from 4 to 10 carbon atoms, from 4 to 9 carbon atoms, from 4 to 8 carbon atoms, from 4 to 7 carbon atoms, from 4 to 6 carbon atoms, from 5 to 10 carbon atoms, from 5 to 9 carbon atoms, from 5 to 8 carbon atoms, from 5 to 7 carbon atoms, from 5 to 6 carbon atoms, from 6 to 9 carbon atoms, from 6 to 8 carbon atoms, from 6 to 7 carbon atoms, from 7 to 9 carbon atoms, or from 7 to 8 carbon atoms.

The linker can also comprise an epoxy group, wherein, two Xs on two adjacent carbon atoms in the $R^3$ group combine to form an oxygen atom. Representative examples of suitable compounds of Formula III that comprise an epoxy group include, but are not limited to, epihalohydrins such as epichlorohydrin, epibromohydrin, epifluorohydrin, epiiodohydrin, or combinations thereof. The linker used in the reaction to form the defoamer composition can be a mixture of two or more compounds of Formula Ill. For example, the linker can be two or more epihalohydrins.

Methods of making defoamer compositions comprising the in situ product(s) of reacting an alcohol, a linker, and a polyalkylene glycol are also described. The reaction can be prepared without a solvent, such as an organic solvent. In some embodiments, the reaction is carried out in a solvent that can azeotrope water, e.g., benzene, toluene, or xylene. In some embodiments, water may be added to the reaction mixture. The water can produce glycerol and increase branching in the polymer. In some embodiments, the reaction is free of solvents or substantially free of solvents.

The reaction can be carried out by first mixing the aliphatic alcohol (e.g., a compound of Formula I, Ib, or Ic) and the polyalkylene glycol (e.g., a compound of Formula or IIb) together in the presence of a base, under reflux conditions, and at atmospheric pressure and then reacting the aliphatic alcohol and the polyalkylene glycol. The base can be an alkali metal hydroxide (e.g., aqueous concentrated sodium hydroxide) or an alkali or alkaline earth metal lower alkoxide (e.g., sodium methoxide). The reflux temperature is generally high enough to remove water produced in the reaction and any water introduced with the base, by distillation. The reaction is continued until substantially all of the water in the reaction mixture is removed, e.g. to a residual water content of 0.5% by weight or less. The reaction mixture can then be cooled. The linking compound (e.g., a compound of Formula III) can then be added to the reaction products of the previous step and then reacted at a temperature of 60° C. to 110° C. In some embodiments, the reaction can be refluxed at the boiling point of the solvent used. The solvent can then be removed from the reaction mixture, for example by vacuum distillation.

The mole percent of polyalkylene glycol relative to the aliphatic alcohol in the reaction can be from 0.5 mol % to 10 mol %. For example, the mole percent of the polyalkylene glycol can be 0.5 mol % to 8 mol %, 0.5 mol % to 7 mol %, 0.5 mol % to 6 mol %, 0.5 mol % to 5 mol %, 0.5 mol % to 4 mol %, 0.5 mol % to 3 mol %, 0.5 mol % to 2 mol %, 0.5 mol % to 1.5 mol %, at least 0.5 mol %, at least 0.6 mol %, at least 0.7 mol %, at least 0.8 mol %, at least 0.9 mol %, at least 1 mol %, at least 1.1 mol %, at least 1.2 mol %, at least 1.4 mol %, at least 1.6 mol %, at least 1.8 mol %, at least 2.0 mol %, at least 2.2 mol %, at least 2.4 mol %, at least 3 mol %, at least 3.5 mol %, at least 4 mol %, at least 4.5 mol %, at least 5 mol %, at least 5.5 mol %, at least 6 mol %, at least 8 mol % or at least 10 mol %. The mole percent of polyalkylene glycol to the aliphatic alcohol can be 10 mol % or less (e.g., 9 mol % or less, 8 mol % or less, 7 mol % or less, 6 mol % or less, 5 mol % or less, 4 mol % or less, 3 mol % or less, 2.5 mol % or less, 2.3 mol % or less, 2.1 mol % or less, 1.9 mol % or less, 1.7 mol % or less, 1.5 mol % or less, 1.3 mol % or less, 1.1 mol % or less, 0.9 mol % or less, 0.8 mol % or less, 0.7 mol % or less, or 0.6 mol % or less).

The weight percent of polyalkylene glycol relative to the aliphatic alcohol in the reaction can be from 0.5 wt % to 15 wt %. For example, the weight percent of the polyalkylene glycol relative to the aliphatic alcohol can be at least 0.75 wt %, at least 1 wt %, at least 1.25 wt %, at least 1.5 wt %, at least 2 wt %, at least 2.5 wt %, at least 3.0 wt %, at least 3.5 wt %, at least 4.0 wt %, at least 4.5 wt %, at least 5.0 wt %, at least 5.5 wt %, at least 6.0 wt %, at least 6.5 wt %, at least 7.0 wt %, at least 7.5 wt %, at least 10 wt %, or at least 12.5 wt %. The weight percent of the polyalkylene glycol relative to the aliphatic alcohol can be 15 wt % or less, 14 wt % or less, 13 wt % or less, 12 wt % or less, 11 wt % or less, 10 wt % or less, 9 wt % or less, 8 wt % or less, 7 wt % or less, 6 wt % or less, 5 wt % or less, 4 wt % or less, 3 wt % or less, or 2 wt % or less, The mole ratio of the base (e.g., sodium hydroxide) to the aliphatic alcohol (e.g., a compound of Formula I, Ib, or Ic) can be 0.5:1 to 1.3:1, 0.7:1 to 1.25:1, 0.9:1 to 1.2:1, 1:1 to 1.2:1, or 1.05:1 to 1.15:1. For example, the mole ratio of base to aliphatic alcohol can be 0.5:1, 0.6:1, 0.7:1, 0.8:1, 0.9:1, 1:1, 1.05:1, 1.06:1, 1.07:1, 1.08:1, 1.09:1, 1.1:1, 1.11:1, 1.12:1, 1.13:1, 1.14:1, 1.15:1, 1.2:1, or 1.3:1.

The mole ratio of the linker to the aliphatic alcohol (e.g., a compound of Formula I, Ib, or Ic) can be 0.4:1 to 1.5:1. For example, the mole ratio of linker to aliphatic alcohol can be 0.5:1, 0.6:1, 0.7:1, 0.8:1, 0.9:1, 1:1, 1.1:1, 1.2:1, 1.3:1, 1.4:1, or 1.5:1. In some embodiments, the mole ratio of the linker to the aliphatic alcohol is from 0.5:1 to 1.2:1 or from 0.6:1 to 0.9:1.

In some embodiments, the defoamer compositions are free, substantially free, or have low amounts of volatile organic compounds (VOC's). Substantially free, as used herein, refers to a defoamer composition, for example, with less than 10 g/L VOC's. In some embodiments, the compositions contain low amount of volatile organic compounds (VOC) and can include less than 100 g/L, less than 50 g/L, less than 30 g/L, less than 20 g/L, less than 15 g/L, less than 10 g/L, less than 5 g/L, less than 3 g/L, less than 1 g/L, or 0 g/L VOCs. Generally, these low VOC compounds are free or substantially free of organic solvents.

The compositions comprising the product(s) of reacting the aliphatic alcohol, linker, and polyalkylene glycol, described herein, are suitable for use as defoamers in aqueous systems. For example, the compositions can be used to control foam generated by any type of aqueous system having a surface tension below that of water such as aqueous-based personal care products (e.g., shampoos, facial cleaners, liquid hand soaps, and the like), and polymer latexes and latex paints.

The compositions can be used in the aqueous system in several ways. For example, the compositions can be added to an aqueous system such as a latex or a latex paint in an amount effective to eliminate or decrease the foam generated as a result of some type of mechanical action such as mixing, pouring, applying to a surface such as by a brush or a roller, and/or shaking. The amount of the compositions required to eliminate and/or decrease the amount of foam is defined as a defoaming effective amount and will vary from one instance to another depending upon the nature of the aqueous system and the defoaming effect desired. A defoaming effective amount will be readily determinable by one of ordinary skill in the art. In some embodiments, the defoaming effective amount can vary from 0.001 wt % to 10.0 wt % based on the weight of the composition.

The defoaming effective amount of the defoamer present in the aqueous formulation can be in an amount of 0.01 wt % to 10 wt %. For example, the defoaming effective amount of the defoamer can be at least 0.03 wt %, 0.05 wt %, 0.07 wt %, 0.1 wt %, at least 0.2 wt %, at least 0.3 wt %, at least 0.4 wt %, at least 0.5 wt %, at least 0.6 wt %, at least 0.7 wt %, at least 0.8 wt %, at least 0.9 wt %, at least 1 wt %, at least 1.5 wt %, at least 2 wt %, at least 2.5 wt %, at least 3 wt %, at least 3.5 wt %, at least 4 wt %, at least 5 wt %, or at least 6 wt %. The defoaming effective amount of the defoamer present in the aqueous formulation can be 5 wt % or less (e.g., 4 wt % or less, 3 wt % or less, 2.5 wt % or less, 2.3 wt % or less, 2.1 wt % or less, 1.9 wt % or less, 1.7 wt % or less, 1.5 wt % or less, 1.3 wt % or less, 1.1 wt % or less, 0.9 wt % or less, 0.8 wt % or less, 0.7 wt % or less, 0.6 wt % or less, 0.5 wt % or less, 0.4 wt % or less, 0.3 wt % or less, or 0.2 wt % or less.

The compositions can be added to an aqueous system as a mixture. The mixture can contain the composition and a carrier oil base. Suitable carrier oil base that can be used in the aqueous formulations can be any water-insoluble liquid that will dissolve and/or disperse the compositions. Representative examples of suitable carrier oil bases include, but are not limited to, mineral oil such as a paraffin oil, naphthenic oils, tall oil fatty acids and ethoxylated tall oil fatty acids, fatty alcohols and ethoxylated fatty alcohols, liquid polypropylene oxide, liquid polyethylene oxide, liquid poly (ethylene oxide-propylene oxides), modified polymethylsiloxanes, polysiloxanes, organosilicones, or any combination thereof. The amount of the composition in the mixture can be from 0.5% to 50% by weight (e.g., from 1% to 20% by weight, from 3% to 15% by weight, or from 4% by weight to 7% by weight).

The compositions can also be added to an aqueous system as part of a multi-component defoamer composition. The multi-component defoamer composition can comprise the composition and a hydrophobic solid dispersed in an inert, water insoluble carrier fluid. The hydrophobic solid is any solid that is insoluble in the carrier fluid. Examples of the hydrophobic solid include, but are not limited to, waxes such as polyethylene wax, ethylene-bis-stearamide; inorganic powders such as silica, and hydrophobed silica. Mixtures of various types of hydrophobic solids can also be used. The carrier fluid useful in the processes and compositions is any water-insoluble liquid such as mineral oils, naphthenic oils, liquid hydrocarbons, tall oil fatty acids and ethoxylated tall oil fatty acids, fatty alcohols and ethoxylated fatty alcohols, liquid polypropylene oxide, liquid polyethylene oxide, liquid poly(ethyleneoxide propyleneoxide), or any combination thereof. The amount of the composition in the mixture of can be the same as the values provided above for the carrier oil base mixtures. For example, the amount of the composition in the mixture can be from 0.5% to 50% by weight (e.g., from 1% to 20% by weight, from 3% to 15% by weight, or from 4% by weight to 7% by weight).

The compositions can also be used in combination with one or more additional defoaming compositions. For example, the compositions can be used with a hyperbranched polymer blend defoamer, an organosilicone emulsion defoamer, a polysiloxane, polyol blend defoamer, or modified polymethylsiloxane defoamer. Specific examples of suitable defoamers that can be used in combination with the compositions disclosed include, but are not limited to, FoamStar® and Foamaster® defoamers, such as FoamStar® ED 2522, FoamStar® ED 2526, FoamStar® ED 2527, FoamStar® SI 2210, FoamStar® SI 2220, FoamStar® SI 2242, FoamStar® SI 2250, FoamStar® SI 2260, FoamStar® SI 2270, FoamStar® SI 2280, FoamStar® SI 2292, FoamStar® ST 2410, FoamStar® ST 2420, FoamStar® ST 2422, FoamStar® ST 2434, FoamStar® ST 2436, FoamStar® ST 2438, FoamStar® ST 2439, FoamStar® ST 2445, or FoamStar® ST 2446.

The additional defoamer can be added in an amount including less than 3% by weight or less than 1% by weight of the aqueous composition.

The compositions disclosed are also useful as thickeners for aqueous compositions, for e.g., for use in hydrophilic emulsion polymer latexes. The products can be added to aqueous compositions, such that the products are present from 0.1 to 20% by weight, based on the solids content of the aqueous composition.

By way of non-limiting illustration, examples of certain embodiments of the present disclosure are given below. Unless indicated otherwise, parts are parts by weight, temperature is in ° C. or is at ambient temperature, and pressure is at or near atmospheric.

Example 1

Preparation of Defoamer Compositions

Defoamer compositions were prepared using the compositions as described in Table 1. The alcohol (400 g), polyethylene glycol, and an aqueous solution of sodium hydroxide (or solid pellets) (in a molar ratio of 1.1:1 sodium hydroxide:alcohol) were mixed. The water generated from the reaction was removed by distillation until no more moisture would distill off. Epichlorohydrin (in a molar ratio of 0.9:1 epichlorohydrin:alcohol) was slowly added to the reaction mixture over 3 hours at 80° C. The resulting mixture was then refluxed at about 100° C. to about 110° C. for about 24 hours. The mixture was then neutralized with an acid and the salt was removed via water washing, centrifugation, filtration, electro dialysis or any combination of these, resulting in an amber liquid. The reaction product was treated as follows:

For defoamer composition 1, the reaction product (4 wt %) was mixed with ethylene bis-stearamide (5 wt %), and mineral oil (91 wt %).

For defoamer composition 2, the reaction product (4 wt %) was mixed with polyethylene wax (7 wt %), and mineral oil (89 wt %).

Defoamer Activity Test—Red Devil

Materials:

Red Devil Shaker (Model 5110-X), ½ pint paint can, Paint gravity cup (weight per gallon cup), Balance (500 gm. capacity min., accurate to "0.01 gm), Test medium—standard batch of defoamer-free paint (also free of entrained air), defoamer reference "standard," and the defoamer composition to be evaluated.

Method:

A 150 cc sample of test paint formulation (See Tables 1 and 2) was weighed into a ½ pint (250 cc) paint can. The defoamer composition being evaluated was added, in an amount described in Table 3. The can was sealed, then placed on the outer-most edge of a Red Devil Paint Shaker Clamp (farthest from axis of rotation) so that maximum arc was achieved. The cans were placed in identical location on the clamp for each test. The cans were shaken for 5 minutes. Immediately after shaking, the weight/gallon of the shaken paint sample was determined. The decrease in density compared with that of the unshaken control paint sample was regarded as the amount of foam generated.

% Air Entrained=[(wt./gal.(unshaken control)−wt/gal (test sample with defoamer))/wt. gal.(unshaken control)]×100

Results:

A plot of the defoamer composition and the percent air entrained in the paint formulation is shown in FIG. 1.

TABLE 1

Paint formulation 1
Standard Formula <0 g/L VOC Semi-gloss Topcoat

| | (g) |
|---|---|
| Grind | |
| WATER | 120 |
| Rheovis PU 1191 | 2 |
| Proxel AQ | 2 |
| Dispex AA 4144 | 7.5 |

TABLE 1-continued

Paint formulation 1
Standard Formula <0 g/L VOC Semi-gloss Topcoat

| | (g) |
|---|---|
| Hydropalat WE 3111 | 2.5 |
| Omyacarb 3 | 25 |
| Ti Pure R-706 | 225 |
| Letdown | |
| Water | 150 |
| Loxanol CA 5320 | 8 |
| Acronal Plus 4130 | 450 |
| Ropaque Ultra | 60 |
| Hydropalat WE 3322 | 6 |
| Ammonium Hydroxide | 0.5 |
| Rheovis PE 1331 | 40 |
| Rheovis PU 1251 | 8 |
| Total | 1106.5 |

TABLE 2

Paint formulation 2
Standard Formula 50 g/L VOC Semi-gloss Topcoat

| | (g) |
|---|---|
| Grind | |
| Water | 150 |
| Ethylene Glycol | 15 |
| Rheovis PU 1191 | 2 |
| Proxel BD 20 | 1 |
| Dispex AA 4144 | 6 |
| Hydropalat WE 3111 | 3 |
| Tipure R706 (DU PONT) | 240 |
| Attagel 50 | 3 |
| Pre-Letdown | |
| Water | 50 |
| Acronal PLUS 4670 | 450 |
| Water | 34 |
| Loxanol CA 5320 | 15 |
| Letdown | |
| Hydropalat WE 3320 | 3 |
| Ammonium hydroxide (aq.) | 1 |
| Water | 44.5 |
| Rheovis PE 1331 | 31.5 |
| Rheovis PU 1215 | 6 |
| Total | 1055 |

TABLE 3

Defoamer composition and results from air entrapment studies

| Defoamer ID | Alcohol | PEG-400 (mol %) | Conc. (wt. %) | Defoamer Conc. (wt. %) | Air % |
|---|---|---|---|---|---|
| *Paint Formulation 1 - Defoamer Formulation 2* | | | | | |
| D1 | Trycol 5950 | 0 | 0.25 | 0.01 | 14.7 |
| D2 | XP50 | 0 | 0.25 | 0.01 | 8.3 |
| D3 | XL50 | 0 | 0.25 | 0.01 | 8.3 |
| D4 | Decanol | 2.5 | 0.25 | 0.01 | 6.5 |
| D5 | Lorol C8-98 | 2.5 | 0.25 | 0.01 | 5.1 |
| D6 | 2EH | 2.5 | 0.25 | 0.01 | 6.5 |
| D7 | 2EH/Dodecanol (75/25) | 2.5 | 0.25 | 0.01 | 7.3 |
| D8 | HD-Ocenol 90/95V | 2.5 | 0.25 | 0.01 | 8.2 |
| *Paint Formulation 2 - Defoamer Formulation 2* | | | | | |
| D1 | Trycol 5950 | 0 | 0.25 | 0.01 | 10.3 |
| D9 | Decanol | 0.0 | 0.25 | 0.01 | 7.30 |
| D10 | Decanol | 1.0 | 0.25 | 0.01 | 5.70 |
| D11 | Decanol | 2.5 | 0.25 | 0.01 | 6.20 |
| D12 | Decanol | 10.0 | 0.25 | 0.01 | 14.30 |
| *Paint Formulation 1 - Defoamer Formulation 2* | | | | | |
| D1 | Trycol 5950 | 0 | 0.25 | 0.01 | 14.7 |
| D10 | Decanol | 1.0 | 0.25 | 0.01 | 7.7 |
| D11 | Decanol | 2.5 | 0.25 | 0.01 | 6.8 |
| D13 | Decanol | 5.0 | 0.25 | 0.01 | 7.1 |
| D12 | Decanol | 10.0 | 0.25 | 0.01 | 9.4 |
| *Paint Formulation 1 in Defoamer Formulation 1* | | | | | |
| D1 | Trycol 5950 | 0 | 0.25 | 0.01 | 12.2 |
| D14 | Decanol | 2.5 | 0.25 | 0.01 | 2.1 |
| D5 | Lorol C8-98 | 2.5 | 0.25 | 0.01 | 2.9 |
| D6 | 2EH | 2.5 | 0.25 | 0.01 | 3.8 |
| D7 | 2EH/Dodecanol (75/25) | 2.5 | 0.25 | 0.01 | 3.9 |
| D8 | HD-Ocenol 90/95V | 2.5 | 0.25 | 0.01 | 2.3 |

TABLE 3-continued

Defoamer composition and results from air entrapment studies

Paint Formulation 1 in Defoamer Formulation 1

| Defoamer ID | Alcohol | PEG-200 (mol %) | Conc. (wt. %) | Defoamer Conc. (wt. %) | Air % |
|---|---|---|---|---|---|
| D15 | XP50 | 0 | 0.25 | 0.01 | 8.3 |
| D3 | XL50 | 0 | 0.25 | 0.01 | 8.3 |
| D16 | Decanol | 2.5 | 0.25 | 0.01 | 8.6 |
| D17 | Decanol | 5.0 | 0.25 | 0.01 | 7.2 |

Defoamer Activity Test—Roller Application

Materials:

3" roller handle, 3" roller cover –3/8" nap, roller pan, Leneta Paper, and Shurline Brush & Roller Cleaner Method:

A 3" roller cover was pre-soaked in distilled water and then spin dried using 10 strokes on Shurline Brush & Roller Cleaner. The contents of the ½ pint paint cans used in Test A (Shaker Test) was poured into a roller pan to saturate nap roller. Paint was then applied to 12 in×12 in sheet of Leneta paper mounted in a vertical position. Roller application technique was consistent from test to test. Immediately upon completion of roll-out, the rate of bubble break was observed. The dry roll-outs were observed for craters resulting from delayed bubblebreak. Roll-outs resulting from various defoamers as well as a blank were rated relative to each other.

TABLE 4

Defoamer composition and results from roll-out studies
Paint Formulation 1 in Defoamer Formulation 2

| Defoamer Active | Alcohol | PEG-400 (mol %) | Conc. (wt. %) | Defoamer Conc. (wt. %) | Roll Out (0 <5) |
|---|---|---|---|---|---|
| Control | Ethoxylated Alcohol | 0 | 0.25 | 0.01 | 0 |
| D3 | Decanol | 2.5 | 0.25 | 0.01 | 4 |
| D5 | Lorol C8-98 | 2.5 | 0.25 | 0.01 | 3 |
| D6 | 2EH | 2.5 | 0.25 | 0.01 | 4 |
| D7 | 2EH/Dodecanol (75/25) | 2.5 | 0.25 | 0.01 | 3 |
| D8 | HD-Ocenol 90/95V | 2.5 | 0.25 | 0.01 | 4 |

Defoamer Activity Test—Percent air entrained

Defoamer compositions were prepared as described above, using the alcohols disclosed in Table 5. The defoamer compositions were loaded into semi-gloss latex paint formulation 2 at 0.25 wt % loading and 0.5 wt % loading. The % air entrapment was evaluated as described above.

Figure 2:
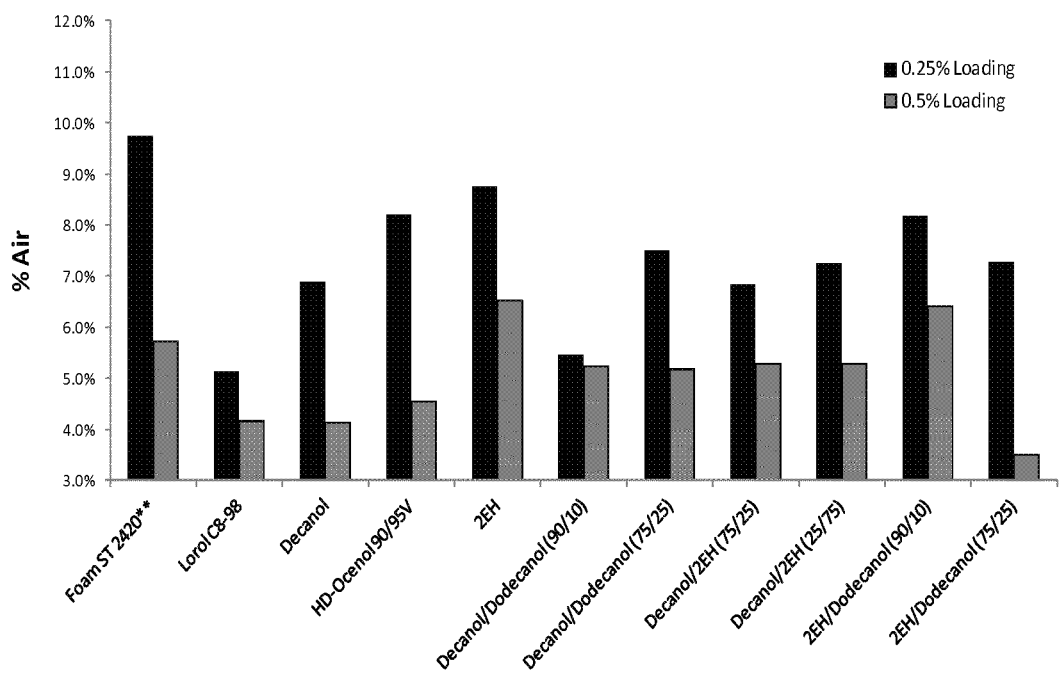
FIG. 2 is a bar graph showing a comparison of the effect of defoamer composition and defoamer loading on the percent air entrapment in an architectural paint formulation.

Results:

The percent air entrained in the paint formulation is shown in Table 5. A graphical comparison of the percent air entrained is shown in FIG. 2.

TABLE 5

Defoamer composition and percent air entrained.

| Alcohol | % Air at 0.25% loading | % Air at 0.5% loading |
|---|---|---|
| FoamStar ® ST 2420** | 9.8 | 6.7 |
| Loral C8-C98 | 5.7 | 4.2 |
| Decanol | 5.1 | 4.1 |
| HD-Ocenol 90/95V | 6.9 | 4.5 |
| 2-ethyl hexanol | 8.2 | 6.5 |
| Decanol/Dodecanol (90/10) | 8.8 | 5.2 |
| Decanol/Dodecanol (75/25) | 5.4 | 5.2 |
| Decanol/2EH (75/25) | 7.5 | 5.6 |
| Decanol/2EH (25/75) | 7.2 | 5.3 |
| 2EH/Dodecanol (90/10) | 8.2 | 6.4 |
| 2EH/Dodecanol (10/90) | 7.3 | 3.5 |

FoamStar ® ST 2420** is a commercial defoamer.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A product which is the reaction product of components consisting of:

(a) a compound of Formula I, $R^1$—OH wherein $R^1$ is an aliphatic alkyl group containing from 4 to 36 carbon atoms, and the alkyl group is unsubstituted or non-alkoxy substituted;

(b) a compound of Formula II,

H—(OR$^2$)$_m$—OH wherein R$^2$ is ethylene, propylene, butylene, or a combination thereof, and m is a number from 1 to 50, and (c) a linking compound of Formula III,

R$^3$(X)$_3$ wherein R$^3$ is an alkanetriyl group containing from 3 to 10 carbon atoms, and wherein each X is independently a halogen, or one X group is a halogen and two X groups represent an epoxy oxygen atom attached to two carbon atoms from the R$^3$ group to form an epoxy group.

2. The product of claim 1, wherein R$^1$ comprises from 4 to 22 carbon atoms.

3. The product of claim 2, wherein R$^1$ comprises from 8 to 12 carbon atoms.

4. The product of claim 1, wherein Formula III is epichlorohydrin.

5. The product of claim 1, wherein m is a number from 1-25.

6. The product of claim 1, wherein OR$^2$ includes ethyleneoxy or propyleneoxy.

7. The product of claim 1, wherein the compound of Formula II is defined as:

H—[OR$^{202}$]$_x$[OR$^{203}$]$_y$—OH wherein R$^{202}$ is an ethylene group, R$^{203}$ is a propylene group, x is a number from 1-25, y is a number from 1-25.

8. The product of claim 1, wherein the mole ratio of Formula III to Formula I present in the reaction is from 0.4:1 to 1.5:1.

9. The product of claim 1, wherein the compound of Formula II is present in the reaction in an amount from 0.5% mol to 10% mol, based on the number of moles of the compound of Formula I.

10. A paint comprising the product of claim 1.

11. A method of making a product according to claim 1, comprising reacting in a reaction mixture components consisting of (a) a compound of Formula I,

R$^1$—OH wherein R$^1$ is an aliphatic alkyl group containing from 4 to 36 carbon atoms, and the alkyl group is unsubstituted or non-alkoxy substituted;

(b) a compound of Formula II,

H—(OR$^2$)$_m$OH wherein R$^2$ is ethylene, propylene, butylene, or a combination thereof, and m is a number from 1 to 50, and (c) a linking compound of Formula III,

R$^3$(X)$_3$ wherein R$^3$ is an alkanetriyl group containing from 3 to 10 carbon atoms, and wherein each X is independently a halogen, or one X is a halogen and two X groups represent an epoxy oxygen atom attached to two carbon atoms from the R$^3$ group to form an epoxy group.

12. The method of claim 11, wherein the reaction mixture further comprises a base.

13. The method of claim 12, wherein the base is sodium hydroxide.

14. The method of claim 12, wherein the mole ratio of base to Formula I present in the reaction is from 1.05:1 to 1.15:1.

15. A method for reducing or preventing foam in a composition comprising adding to the composition, the product as claimed in claim 1.

16. The method of claim 15, further comprising adding a carrier selected from the group consisting of mineral oils, naphthenic oils, liquid hydrocarbons, silicon oils, polysiloxanes, modified polymethylsiloxanes, organo silicones, and combinations thereof to the composition.

17. The method of claim 15, further comprising adding a hydrophobic solid selected from wax, silica, hydrophobized silica, or a combination thereof to the composition.

18. A method of making a defoamer composition, comprising reacting components consisting of:

(a) a compound of Formula II,

H—(OR$^2$)$_m$—OH wherein R$^2$ is ethylene, propylene, butylene, or a combination thereof, and m is a number from 1 to 50, (b) a linking compound of Formula III,

R$^3$(X)$_3$ wherein R$^3$ is an alkanetriyl group containing from 3 to 10 carbon atoms, and wherein each X is independently a halogen, or one X is a halogen and two X groups represent an epoxy oxygen atom attached to two carbon atoms from the R$^3$ group to form an epoxy group, and (c) a compound of Formula Ib, R$^1$—(OR$^{101}$)$_n$—OH wherein R$^1$ is an aliphatic alkyl group containing from 4 to 36 carbon atoms, and the alkyl group is unsubstituted or non-alkoxy substituted; R$^{101}$ is ethylene, propylene, butylene, or a combination thereof, and n is 0, and wherein the reaction does not include an organic solvent.

19. The product of claim 1, wherein R$^1$ is an aliphatic alkyl group containing from 4 to 36 carbon atoms and the alkyl group is unsubstituted or substituted with halogen, amino, amido, amidine, imine, cyano, nitro, azido, sulfhydryl, alkylthio, sulfate, sulfonate, sulfamoyl, sulfonamido or sulfonyl.

20. The product of claim 1, wherein R$^1$ is an aliphatic unsubstituted alkyl group containing from 4 to 36 carbon atoms.

* * * * *